US008024675B1

(12) United States Patent
Gupta et al.

(10) Patent No.: US 8,024,675 B1
(45) Date of Patent: Sep. 20, 2011

(54) METHOD AND SYSTEM FOR WAFER TOPOGRAPHY-AWARE INTEGRATED CIRCUIT DESIGN ANALYSIS AND OPTIMIZATION

(75) Inventors: Puneet Gupta, Santa Clara, CA (US); Andrew Kahng, Del Mar, CA (US); Puneet Sharma, La Jolla, CA (US); Swamy Muddu, La Jolla, CA (US)

(73) Assignee: Tela Innovations, Inc., Los Gatos, CA (US)

( * ) Notice: Subject to any disclaimer, the term of this patent is extended or adjusted under 35 U.S.C. 154(b) by 544 days.

(21) Appl. No.: 11/499,070

(22) Filed: Aug. 4, 2006

(51) Int. Cl.
*G06F 17/50* (2006.01)
*G06F 9/455* (2006.01)
(52) U.S. Cl. .............. 716/54; 716/55; 716/132
(58) Field of Classification Search .......... 716/2, 5, 716/11, 21, 54, 55, 132
See application file for complete search history.

(56) References Cited

U.S. PATENT DOCUMENTS

| | | | |
|---|---|---|---|
| 2002/0048708 A1* | 4/2002 | Chen et al. | 430/5 |
| 2004/0073885 A1* | 4/2004 | Ohnuma et al. | 716/19 |
| 2005/0273753 A1* | 12/2005 | Sezginer | 716/21 |
| 2006/0000964 A1* | 1/2006 | Ye et al. | 250/208.1 |
| 2006/0110837 A1* | 5/2006 | Gupta et al. | 438/14 |
| 2006/0150132 A1* | 7/2006 | Gupta | 716/5 |
| 2006/0266243 A1* | 11/2006 | Percin et al. | 101/484 |
| 2007/0059615 A1* | 3/2007 | Op de Beeck | 430/30 |
| 2007/0106966 A1* | 5/2007 | Inoue et al. | 716/4 |
| 2007/0106967 A1* | 5/2007 | Inoue et al. | 716/4 |

OTHER PUBLICATIONS

Zhang et al.; "A Temperature-Aware Model of Subthreshold and Gate Leakage for Architects"; Mar. 2003; University of Virginia ECE Tech. Report CS-2003-05; All pages.*
Khang et al.; "Defocus-Aware Leakage Esitmation and Control"; Aug. 10, 2005; ACM; All pages.*
Gupta et al.; "Self-Compensating Design for Focus Variation"; Jun. 17, 2005; ACM; All pages.*
Austin et al.; "Special Problems in the Estimation of Power-Law Spectra as Applied to Topological Modeling"; 1994; IEEE; All pages.*
Bobba et al.; "Maximum Leakage Power Estimation for CMOS circuits"; 1999; ACM; All pages.*
Chen et al.; "Leakage Power Modeling and Optimization in Interconnection Networks"; 2003; ACM; All pages.*

* cited by examiner

*Primary Examiner* — Suresh Memula
(74) *Attorney, Agent, or Firm* — Martine Penilla & Gencarella, LLP

(57) ABSTRACT

A method and system for designing an optimized specification of an integrated circuit (IC) is provided. The IC comprises a plurality of cells, and each of the cells comprises a plurality of transistors. The method includes preparing a linewidth map of at least one device of the plurality of devices, performing a topography-aware analysis of the at least one device based on the linewidth map, and designing the optimized specification of the IC based on the topography-aware analysis. In another embodiment, a method for estimating a leakage power of at least one device in an IC is provided. The method includes determining a defocus and a pitch value, determining a linewidth value based on the defocus and pitch value, and estimating the leakage current and/or leakage power based on the linewidth value.

45 Claims, 11 Drawing Sheets

METHOD AND SYSTEM FOR WAFER TOPOGRAPHY-AWARE INTEGRATED CIRCUIT DESIGN ANALYSIS AND OPTIMIZATION

BACKGROUND OF THE INVENTION

1. Field of the Invention

This invention relates in general to the design of integrated circuits (ICs) and in particular to designing IC layouts.

2. Description of the Related Art

A number of advanced technologies are applied together in modern integrated circuit (IC) designing to achieve nanometer-scale feature sizes. One of the technologies applied is planarization. Planarization is performed during the fabrication of multi-layered ICs after the creation of each successive layer. This ensures a flat wafer surface that enables accurate fabrication of subsequent layers of the IC. Existing planarization techniques such as chemical-mechanical polishing (CMP) can yield uneven results. CMP simultaneously polishes different materials with varying hardness, for example, metal, dielectric and barrier materials in the back-end-of-line interconnect stack, or nitride and oxide in front-end-of-line shallow-trench isolation Consequently, post-planarization wafer topography becomes a function of relative proportions and patterning of different materials in a region, and can result in an uneven post-CMP wafer surface. The uneven wafer topography caused by CMP is primarily due to erosion and dishing phenomena. Erosion is a deviation in the height of a wafer surface over a large area, and is typically caused by pattern density variations at length scales of hundreds or thousands of microns. Dishing is a localized deviation in, for example, an individual conductor height due to softness of copper metal that causes extra metal removal in the middle of wide wires.

Both erosion and dishing cause variations on the surface of the IC and lead to imperfect optical lithography by acting as a source of defocus, that is, deviation from nominal of the distance between lens and wafer. Defocus can cause unforeseen lithographic errors resulting in dimensional variation in the plane of the IC being manufactured. Such variations occurring in features on polysilicon layers of the IC can result in variation of polysilicon linewidths, that is, transistor channel lengths. Variation of wire widths results when such variations occur on the interconnect layers. Further, if such variations occur on contact and via layers, then coverage area, reliability, and resistance may vary significantly from nominal. These variations are not presently accounted for in the application of reticle enhancement techniques (RETs) such as optical proximity correction (OPC), sub-resolution assist feature (SRAF) insertion, or phase-shifting mask (PSM) design.

The variation in linewidth (i.e., channel length) of a transistor device translates to large variation in leakage current of the device. Leakage current is directly proportional to leakage power dissipation and has an exponential dependence on polysilicon linewidth. It is one of the most critical challenges for ultra-deep sub-micron process technologies. Across-chip linewidth variation (ACLV) is one of the most significant contributors to leakage power variability, and causes inaccurate estimation of leakage power that degrades the results of existing leakage reduction approaches. Known leakage optimization techniques are either oblivious to ACLV or model it as a random variable, resulting in pessimistic guardbanding and over-design. This in turn causes loss of performance and parametric yield in the manufactured IC.

In light of the above discussion, there exists a need for topography-aware methods for IC analysis and optimization, and for a system that can design an optimized specification of an IC. The method and system should be capable of improving the optimization of signal delay, circuit timing, leakage power, active power, and other design metrics of manufactured ICs. The method and system should also be capable of being used within the existing IC design flow, to make use of existing and known analysis tools such as timing analysis, signal integrity analysis, power analysis, reliability analysis, and so on.

SUMMARY OF THE INVENTION

An object of the present invention is to design an optimized specification of an integrated circuit (IC), based on performing a topography-aware analysis of the IC.

Another object of the present invention is to perform a topography-aware estimation of leakage current and/or leakage power for at least one device in an IC.

An embodiment of the present invention provides a method and system for designing an optimized specification of the IC, which includes a plurality of standard cells, or, simply, cells. Each of the plurality of cells includes a plurality of devices. The method includes preparing a linewidth map of at least one device of the plurality of devices, based on one or more defocus values and a design layout of the IC. The method further includes performing a topography-aware analysis of the at least one device based on the linewidth map, one or more characterization models, and a topography map of the IC. The method further includes designing an optimized specification of the IC with respect to one or more design objectives, based on the topography-aware analysis and one or more design constraints.

Another embodiment of the invention provides a method and system for estimating the leakage current of at least one device in an IC. The leakage power can be determined from the leakage current. The method includes determining a defocus value of the at least one device. The method further includes determining a pitch value of the at least one device. The method further includes determining a linewidth value for the at least one device based on the defocus value and the pitch value. The leakage current and/or leakage power for the at least one device is then estimated based on the linewidth value.

In accordance with an embodiment, the system includes a mapping engine, an analysis engine, and an optimization engine. The mapping engine prepares the linewidth map of the at least one device based on one or more defocus values, a topography map of the IC, and a design layout of the IC. The analysis engine performs the topography-aware analysis of the at least one device based on the linewidth map, one or more characterization models, the design layout of the IC, and the topography map of the IC. The optimization engine designs the optimized specification of the integrated circuit with respect to one or more design objectives, based on the topography-aware analysis and one or more design constraints.

Various embodiments of the present invention offer the following advantages. The present invention utilizes systematic components of linewidth variation for improving optimizations of signal delay, circuit timing, leakage power, active power and other design objectives, using such degrees of freedom as interconnect dimensions, transistor gate lengths, transistor threshold voltage assignments, and transistor gate widths. Further, linewidth variations are modeled using pitch and defocus. By analyzing a circuit layout to calculate device pitches, and using these pitches, in conjunction with defocus values and a predefined lookup table, printed linewidths can be predicted so as to enable accurate leakage estimation and design of an optimized IC specification. Various embodiments of the invention are in accordance with existing IC design processes including, for example, Local Oxidation of Silicon (LOCOS) and Shallow-Trench Isolation (STI). The present invention is also capable of being used within the existing IC design cycle, with leakage estimation and optimized circuit design being performed at the design stage in either the full-custom or semi-custom design context.

BRIEF DESCRIPTION OF THE DRAWINGS

So that the above-recited elements of the present invention can be understood in detail, a more particular description of the invention, briefly summarized above, may be had by reference to various embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
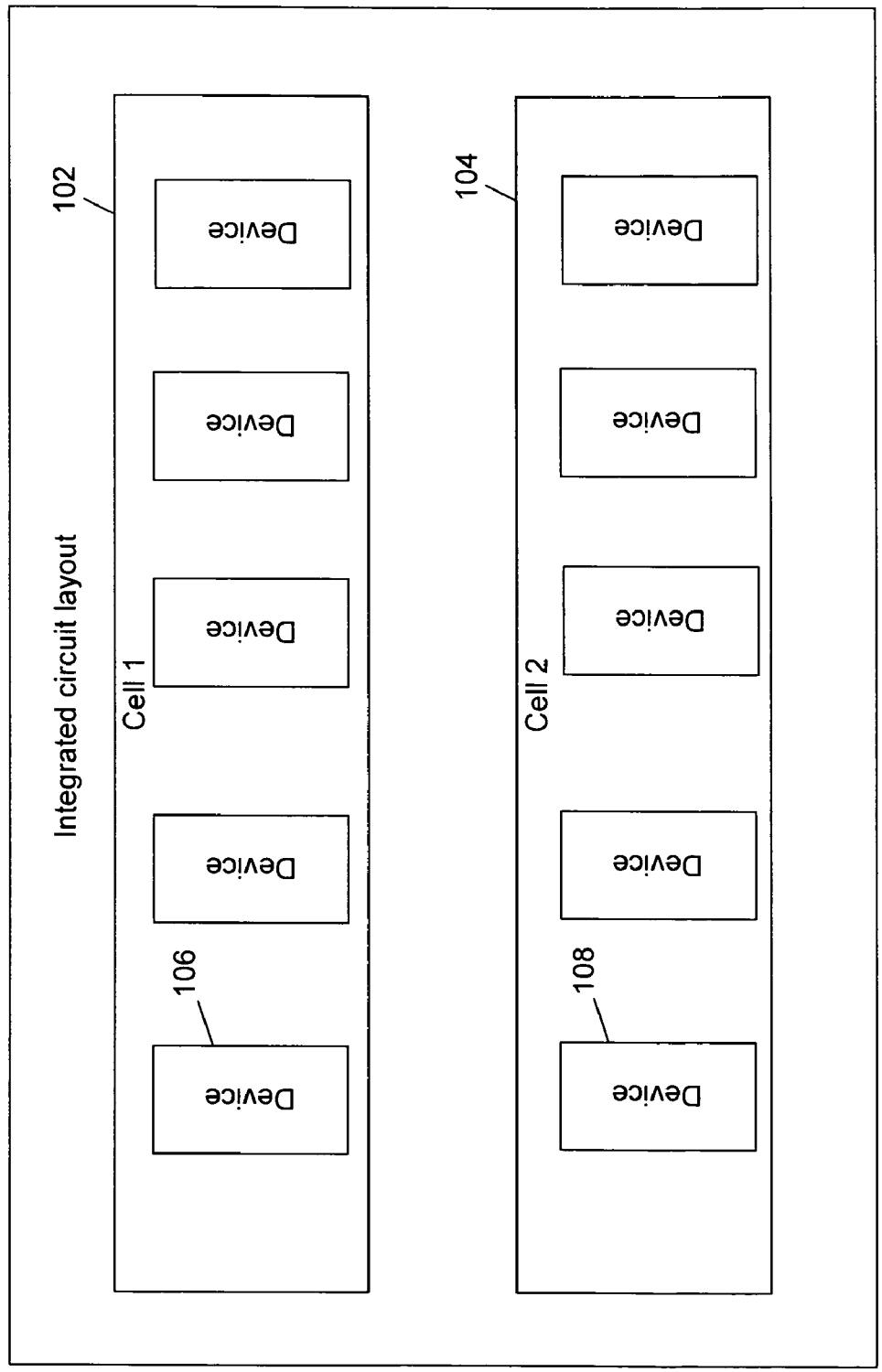
FIG. 1 is a block diagram illustrating exemplary elements of an integrated circuit, in accordance with an embodiment of the present invention.

The present invention relates to a method and system for designing an optimized specification of an integrated circuit (IC), which includes a plurality of standard cells or, simply, cells. The plurality of standard cells can be referred to as cells. Each of the plurality of cells includes a plurality of transistor devices or, simply, devices. The plurality of transistor devices can be referred to as devices. The present invention provides for a method for designing an optimized specification of the IC. The optimized specification can be defined at either a circuit level or a layout level of IC design. The method includes preparing a linewidth map of at least one device of the plurality of devices, performing a topography-aware analysis of the at least one device based on the linewidth map, and designing the optimized specification of the IC, based on the topography-aware analysis. Further, preparing the linewidth map is based on one or more defocus values and a design layout of the IC. The one or more defocus values may be derived from a topography map of the IC. The linewidth map is prepared using a defocus lookup table. Performing the topography-aware analysis is based on one or more characterization models and the topography map of the IC. The one or more characterization models include one or more device models, one or more library cell models, and one or more interconnect models. Further, the topography map is based on a process simulation of the design layout of the IC with respect to one or more process models. The process simulation can include chemical-mechanical polishing (CMP) simulation, one or more reticle effects and one or more wafer-scale bias effects (for example, radial variation of photoresist spin-on and resulting thickness). The optimized specification is designed with respect to one or more design objectives, subject to one or more design constraints. The one or more design constraints include clock period constraints, boundary timing constraints, setup time slack constraints, hold time slack constraints, arrival time skew constraints, leakage power constraints, dynamic power constraints, and reliability constraints. The method further includes evaluation of the optimized specification of the IC according to the one or more design objectives, which can include lithographic process window, total leakage power, maximum clock frequency, functional yield, and parametric yield at a given target clock frequency. Further, the one or more design objectives can be considered at one or more of a chip level, a cell/block level and a device level of the IC design.

In another embodiment, the present invention provides for a method for estimating a leakage current of the at least one device. The method includes determining a defocus value of the at least one device, determining a pitch value of the at least one device, determining a linewidth value of the at least one device based on the defocus value and the pitch value, and estimating the leakage current for the at least one device based on the linewidth value. Further, the linewidth value is determined from a predefined lookup table. The predefined lookup table includes one or more linewidth values or ranges of linewidth values ("corners") corresponding to each given combination of pitch value and defocus value.

FIG. 1 is a block diagram illustrating exemplary elements of an integrated circuit, in accordance with an embodiment of the present invention. FIG. 1 shows an integrated circuit (IC) 100, which includes a cell 102 and a cell 104. It will be apparent to those skilled in the art that IC 100 can also include other cells (not shown in FIG. 1). Cell 102 includes a device 106 and other similar devices. Similarly, cell 104 includes a device 108 and other similar devices. IC 100 can be defined by a drawn layout or by a design netlist or schematic.

Figure 2:
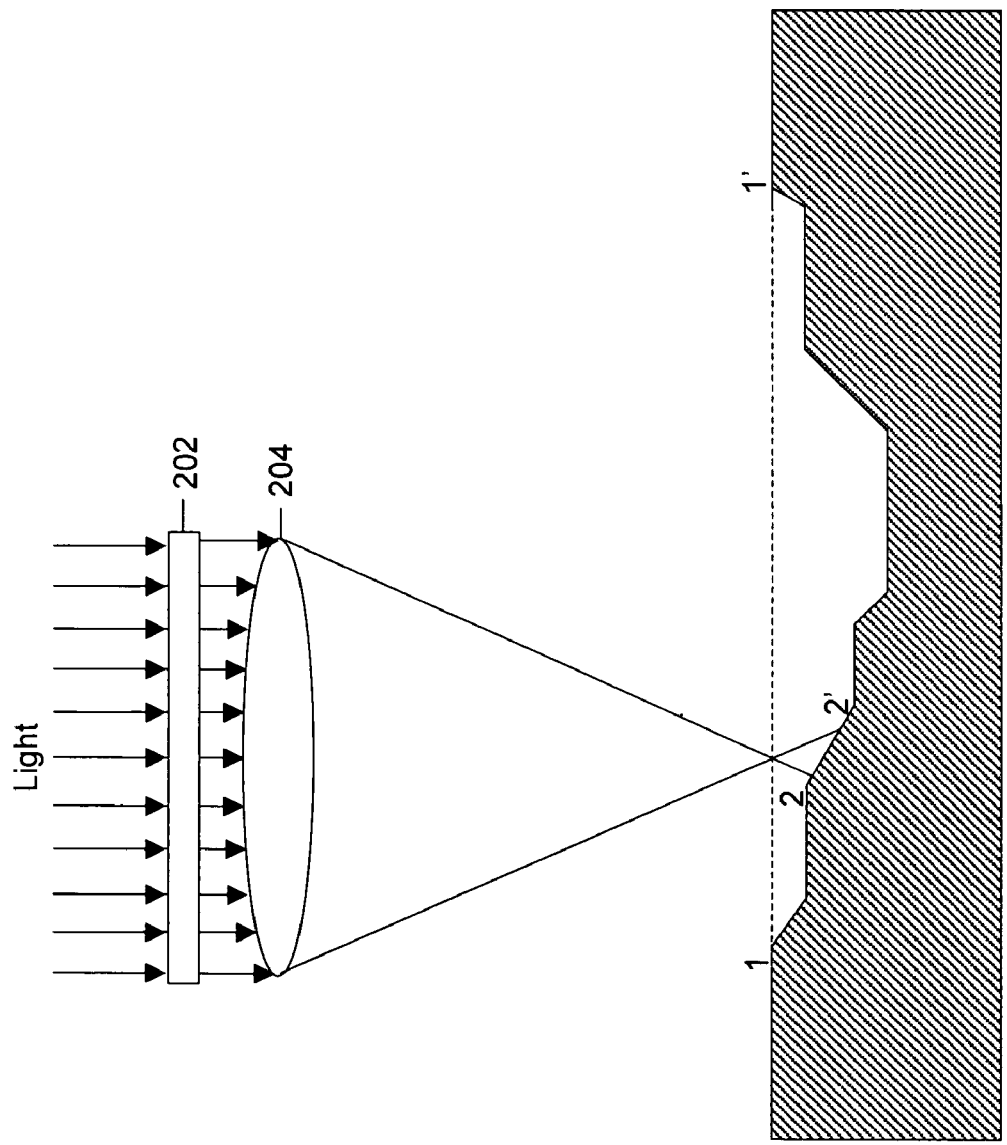
FIG. 2 is a diagram illustrating a cross section of exemplary non-planar wafer topography, in accordance with an embodiment of the present invention.

FIG. 2 is a diagram illustrating a cross section of exemplary non-planar wafer topography, in accordance with an embodiment of the present invention. Light passing through a reticle 202 is converged using a lens 204 to form an image on the surface of the wafer. If the image formed by reticle 202 and lens 204 coincides with the wafer plane 1-1', the image prints with acceptably high resolution. There are techniques known in the art that try to ensure that the wafer topography conforms to the wafer plane 1-1'. One such technique is Chemical-Mechanical Polishing (CMP). The CMP technique simultaneously polishes different materials which have varying hardness. The post-CMP wafer topography is a function of relative proportions and patterning of different materials in a region, resulting in an uneven wafer surface. However, due to topography variations caused by, for example, erosion and dishing, the image prints out of focus with low resolution on the surface 2-2'. This out-of-focus printing of the image leads to topography-dependent linewidth variation of the devices. Since erosion and dishing are caused primarily due to the physical mechanics of the CMP process, these variation phenomena can be analyzed and predicted using process simulations. These process simulations can include, for example, CMP simulation and the simulation of one or more reticle- and wafer-scale bias effects. Other optical and mechanical effects including, but not limited to, wafer stage misalignment, substrate flatness, and field tilt variation also result in linewidth variations and can be incorporated into the simulation.

Figure 3:
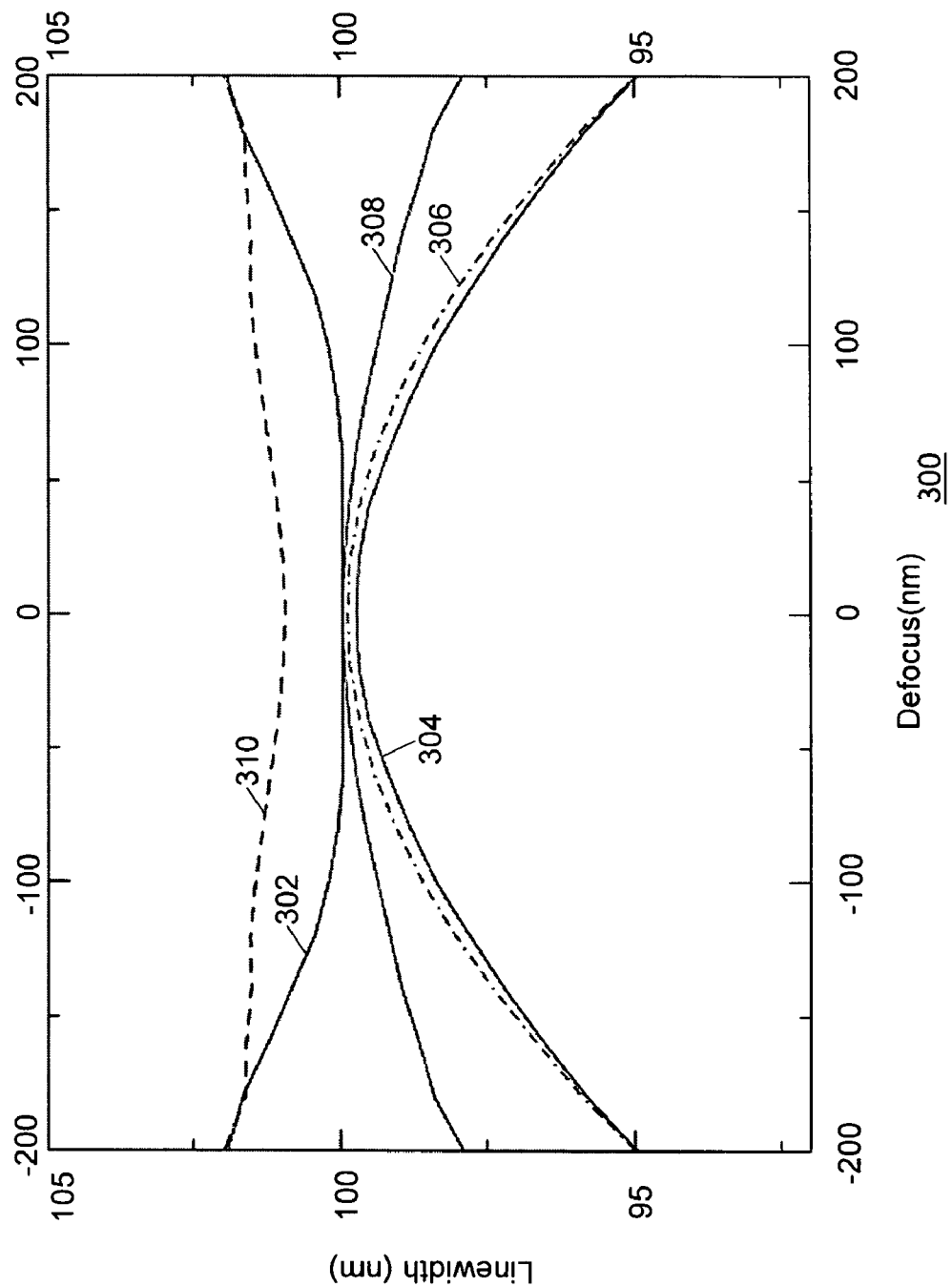
FIG. 3 is a plot illustrating linewidth variation with respect to defocus for patterns with different pitches in a generic 90 nm (nanometer) process technology, in accordance with an embodiment of the present invention.

FIG. 3 is a plot 300 illustrating linewidth variation with respect to defocus for patterns with different pitches in an exemplary 90 nm technology, in accordance with an embodiment of the present invention. Plot 300 may also be referred to as a Bossung plot. The generation of plot 300 is explained later in conjunction with FIG. 5. Plot 300 shows that for a particular defocus value, linewidth increases for dense pitches and decreases for isolated pitches. For example, for a dense pitch curve 302, linewidth increases from 100 nm at nominal focus (0 nm defocus) to 102 nm at −200 nm defocus. For an isolated pitch curve 304, linewidth decreases from 100 nm at nominal focus (0 nm defocus) to 95 nm at −200 nm defocus. Similarly, curves 306, 308, and 310 represent variation of linewidth with defocus when pitch is varied from isolated pitch to dense pitch. In the plot 300, the dense pitch corresponds to a minimum pitch of 250 nm between poly lines in a 5-bar test pattern and the sparse pitch corresponds to a pitch of 650 nm between poly lines in a 3-bar test pattern. Plot 300 further shows that the decrease in linewidth for isolated pitches is greater than the increase in linewidth for dense pitches over the same range of defocus values. Consequently, devices with isolated pitches cause more leakage power than devices with dense pitches. Further, it can be seen from plot 300 that lines corresponding to dense pitches tend to "smile", while lines corresponding to isolated pitches tend to "frown" with variation of defocus. Defocus is caused due to several sources, such as variation in shallow trench isolation (STI) layer thickness during chemical mechanical planarization (CMP), lens aberrations, wafer stage misalignment and resist thickness variation. Further, linewidth variation caused by defocus due to thickness variation can be modeled systematically by layout density analysis.

Figure 4:
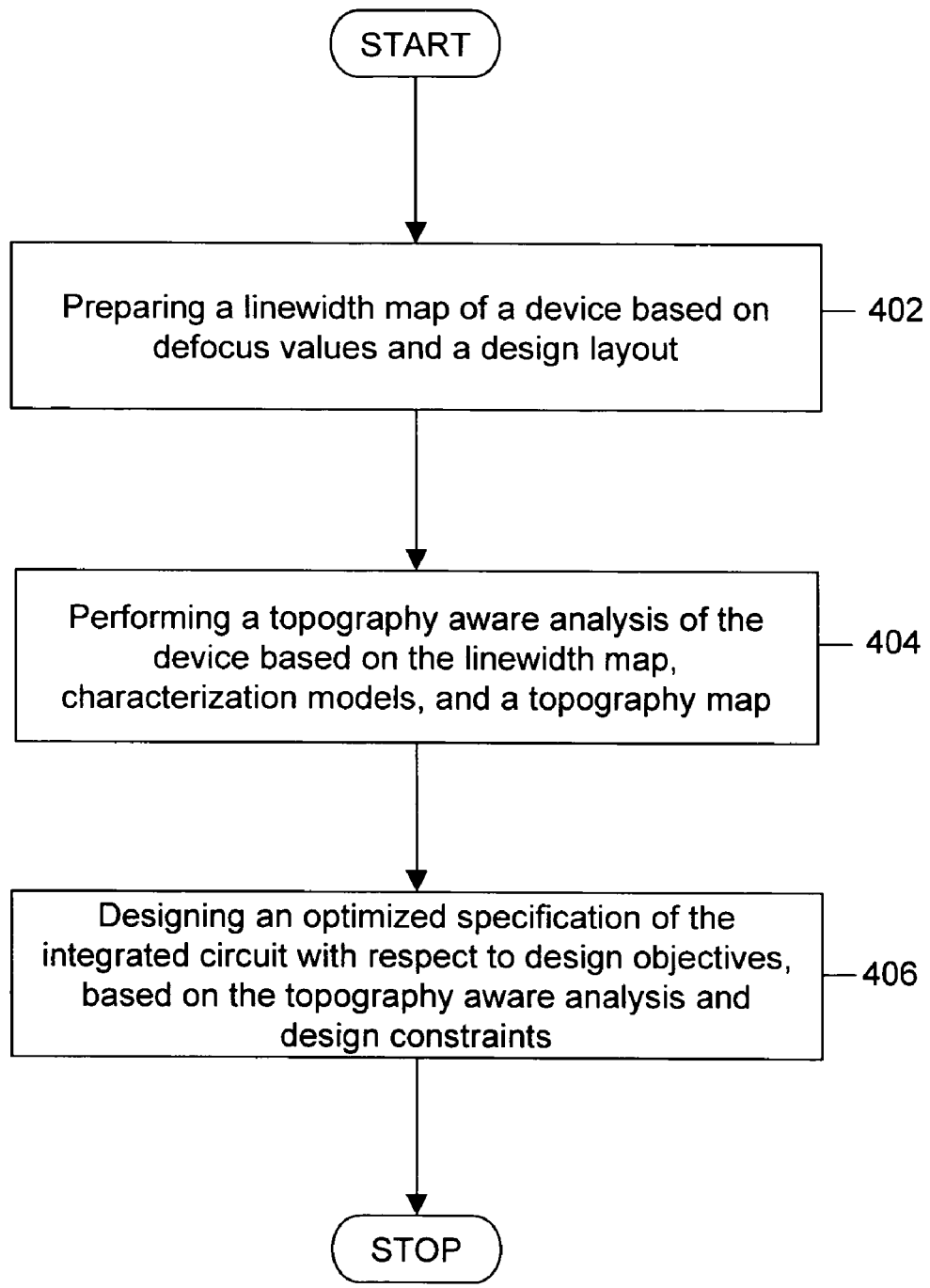
FIG. 4 is a flowchart illustrating a method for designing an optimized specification of an integrated circuit, in accordance with an embodiment of the present invention.

FIG. 4 is a flowchart of a method for designing an optimized specification of an integrated circuit, in accordance with an embodiment of the present invention. The method has been explained in conjunction with IC 100 described in FIG. 1. In an embodiment, the method can be embodied in an Electronic Design Automation (EDA) tool. Further, an IC can be designed utilizing the method. At step 402, a linewidth map is prepared for device 106. It will be apparent to those skilled in the art that the linewidth map can be prepared for more than one device if required. The linewidth map is based on one or more defocus values and a design layout of IC 100. The one or more defocus values are derived from a topography map of IC 100. In an embodiment, the linewidth map can be obtained from the topography map of IC 100. In another embodiment, the linewidth map can be obtained from a defocus lookup table. The defocus lookup table includes variation of linewidth of a given feature from a nominal value, based on local wafer topography deviation from nominal (defocus effects). The defocus lookup table is obtained from a lithography simulation based on one or more defocus values and one or more process models, such that each of the one or more defocus values corresponds to one or more process models. Further, the lithography simulation can include at least one of a photo process, a resist process, and an etch process.

At step 404, the linewidth map, one or more characterization models, and a topography map of IC 100 are used to perform a topography-aware analysis. In an embodiment, the topography-aware analysis can further be with respect to one or more of timing information, timing slack, leakage power, reliability, parametric yield, random defect yield, and total power of the integrated circuit. The one or more characterization models can be, for example, one or more device models, one or more library cell models, and/or one or more interconnect models. The one or more device models are functions of the three-dimensional shapes of the plurality of devices and are based on three-dimensional shape information. The one or more library cell models can include, for example, power and timing models of library cells, and are based on the one or more device models. The one or more interconnect models can include, for example, wire parasitic (resistance, inductance, and capacitance) models and are based on three-dimensional wiring shape information. Further, the topography map can be obtained from a process simulation of the design layout of IC 100 with respect to one or more process models. In one embodiment, the process simulation can include a CMP simulation of dielectric and metal structures in one or more consecutive interconnect layers of IC 100. In another embodiment, the process simulation can include CMP simulation of shallow trench isolation and one or more transistor-forming layers of IC 100. In yet another embodiment, the process simulation can include one or more reticle- and wafer-scale bias effects.

Further, at step 406, an optimized specification of IC 100 is designed with respect to one or more design objectives, based on the topography-aware analysis and one or more design constraints. Designing the optimized specification of IC 100 is further based on one or more predefined degrees of freedom of the optimization. Examples of the one or more predefined degrees of freedom of optimization include, but are not limited to, transistor gate length sizing, transistor gate width sizing, transistor threshold voltage assignment, and interconnect dimensional sizing. The design constraints can be, for example, clock period constraints, boundary timing constraints, setup time slack constraints, hold time slack constraints, arrival time skew constraints, leakage power constraints, reliability constraints, and dynamic power constraints. In an embodiment, the optimized specification is defined at a circuit level or a layout level of the design of the IC 100.

Figure 5:
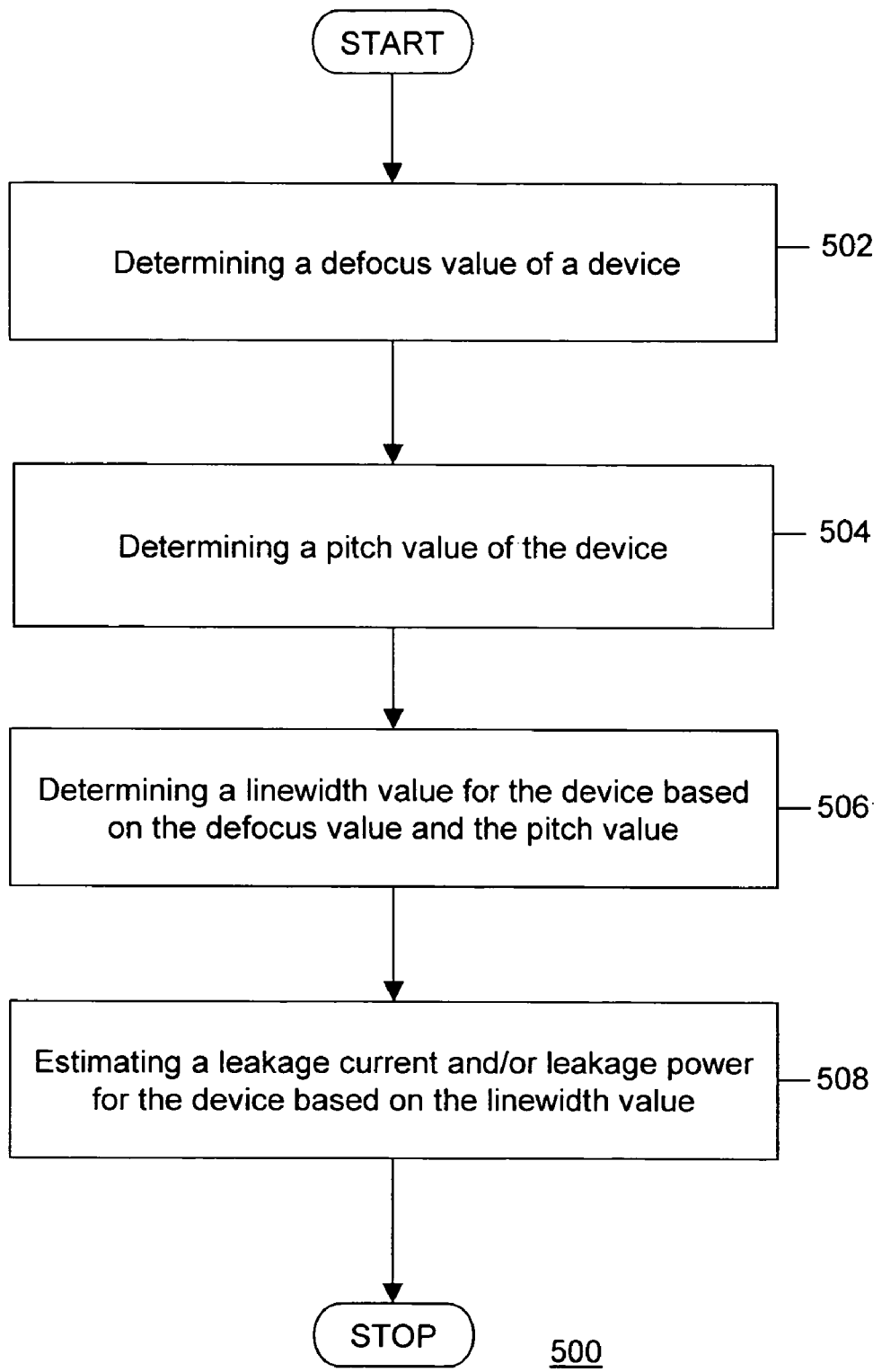
FIG. 5 is a flowchart illustrating a method for estimating a leakage current of at least one device in an integrated circuit, in accordance with an embodiment of the present invention.

FIG. 5 is a flowchart of a method for estimating a leakage current of the at least one device 106 in IC 100, in accordance with an embodiment of the present invention. The leakage current can be used to determine the leakage power of the at least one device 106 in IC 100. The method can be embodied in an Electronic Design Automation (EDA) tool. IC 100 includes a plurality of cells, and each of the plurality of cells includes a plurality of devices. At step 502, a defocus value of device 106 is determined. In an embodiment, the defocus value can be determined using a defocus-aware, topography-oblivious (DATO) flow. In a DATO flow, the comprehension of defocus is based on the fact that the range of linewidth under defocus conditions can be predicted according to the Bossung plot for devices with dense pitches or with sparse pitches. Devices having intermediate pitches, or a dense pitch on one side and a sparse pitch on the other side, print with lesser linewidth variation. In an embodiment, the defocus value can be, for example, a probability distribution. In another embodiment, a device-specific defocus value is applied within a defocus-aware, topography-aware (DATA) flow. In a DATA flow, the defocus value is determined from a topography simulation, for example, a CMP simulation, or a layout analysis of IC 100. In an embodiment, the defocus value can also be a range. In a further embodiment, the defocus value can be a distribution.

At step 504, a pitch value of device 106 is determined. In an embodiment, the pitch value is determined from a layout analysis of IC 100. Standard-cell placement of a design along with the position of devices within each cell can be used to compute the pitch value. The pitch value can be based on one or more of an inter-cell spacing, a cell orientation, and a device-to-boundary spacing. The inter-cell spacing is the spacing between a cell and its neighboring cells. The cell orientation is the orientation of a cell and its neighboring cells. The device-to-boundary spacing is the spacing between each device and boundaries of the cell containing the device. Further, the pitch value can also be based on the presence or anticipated presence of inserted features including scattering bars, sub-resolution assist features (SRAFs), and etch dummy shapes.

At step 506, a linewidth value for device 106 is estimated. The linewidth value is based on the defocus value and the pitch value. For particular values of defocus and pitch, the linewidth value can be obtained from plot 300. The linewidth value can also be determined using a predefined lookup table. The predefined lookup table includes one or more linewidth values (or, ranges of linewidth values that define "corners"). Each of the one or more linewidth values in the predefined lookup table corresponds to a predetermined defocus value and a predetermined pitch value. The predefined lookup table captures systematic variation in linewidth due to defocus and pitch, and can be used to predict linewidth value for given pitch and defocus values. In an embodiment, the predefined lookup table can be created by constructing line-and-space patterns of a gate poly with different spacings to simulate different pitches. The linewidth of a gate poly in each pattern can be fixed at, for example, 100 nm which corresponds to the gate length in a typical 90 nm low-power process technology. Pitch value can be varied from 250 nm (an exemplary minimum spacing rule value) to 850 nm, in steps of 100 nm. For analysis, a poly feature is selected from the pattern and is referred to as the feature of interest. The feature of interest is selected such that it has two identical neighbors on each side, at various spacings. Therefore, a total of five features in each pattern are considered. Next, for each pattern, neighbors more than 800 nm away from the feature of interest are removed. Further, an optical radius of 800 nm is used for all experiments. After construction of the line-and-space patterns, Optical Proximity Correction (OPC) of the patterns is performed with zero defocus. The OPC can be performed using, for example, the Calibre OPC tool from Mentor Graphics Corporation. For measuring linewidth variations due to defocus, a lithography simulation at different defocus levels for all the patterns is performed. In one embodiment, the defocus values can be selected from a range, for example (−200 nm, 200 nm) in steps of 20 nm. Linewidth values are then extracted from all simulated printed images at each defocus level. Further, resist models for each defocus level can be generated with a numerical aperture (NA) of, for example, 0.7 in Calibre WorkBench and the resist threshold can be set at, for example, 0.38. In an embodiment, the predefined lookup table can include rows corresponding to patterns and columns corresponding to defocus levels. Entries in the predefined lookup table provide printed linewidth values for the feature of interest in a pattern. Further, plot 300 can be represented as, for example, a Bossung plot or a Bossung lookup table.

At step 508, the leakage current for device 106 is estimated, based on the linewidth value, which corresponds to the transistor gate length. For estimating the leakage power, an average leakage power for device 106 is determined. Further, the average leakage can be determined by propagating at least one predetermined logic pattern through device 106. The average per-unit gate width leakage of a device can be calculated by multiplying a pre-characterized leakage value of a unit width device with the same gate length as the device, with a fraction of the number of predetermined logic patterns in which the device leaks. Predetermined logic patterns are assumed to cause leakage power in a device when different logic values are recorded on the drain and source terminals while the device is switched off. In an embodiment, leakage of stacked devices can be ignored since the magnitude of leakage for stacked devices is substantially less than leakage for non-stacked devices due to self reverse-biasing of stacked devices. In a further embodiment, the pre-characterized leakage value can be selected from a predefined table. The predefined table includes pre-characterized leakage values corresponding to predefined linewidth values. In an embodiment, the pre-characterized leakage values can be determined by using, for example, Simulation Program with Integrated Circuit Emphasis (SPICE) simulations, to calculate leakage values for p-channel MOS (PMOS) and n-channel MOS (NMOS) devices of unit gate width and for all linewidth (i.e., device gate length) values likely to be encountered, for example, 60 nm to 140 nm.

In an embodiment, the method as described in conjunction with FIG. 5 can be modified to estimate leakage values for device 106 for different input predetermined logic patterns using, for example, state probabilities, for state-dependent leakage estimation. Further, a design leakage value can be determined by summing up leakage values for cells of the design.

Figure 6:
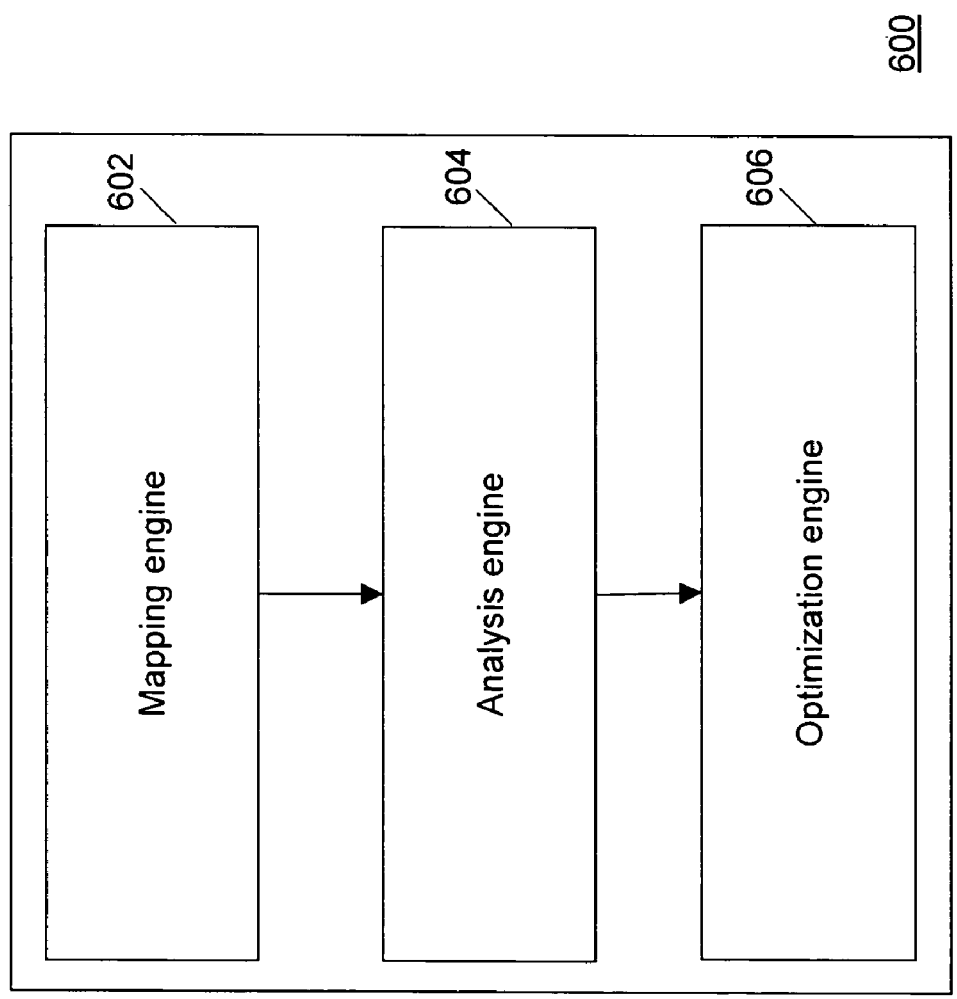
FIG. 6 is a block diagram illustrating a system for designing an optimized specification of an integrated circuit, in accordance with an embodiment of the present invention.

FIG. 6 is a block diagram illustrating a system 600 for designing an optimized specification of integrated circuit (IC) 100, in accordance with an embodiment of the present invention. The system can be embodied in an Electronic Design Automation (EDA) tool and can be used to design an IC. System 600 includes a mapping engine 602, an analysis engine 604, and an optimization engine 606. Mapping engine 602 is used to prepare a linewidth map of device 106. Further, the linewidth map can be based on one or more defocus values, a topography map, and a design layout of the IC. Analysis engine 604 is used to perform a topography-aware analysis of device 106. The topography-aware analysis can be based on the linewidth map, one or more characterization models, the design layout, and the topography map of the IC. Optimization engine 606 is used to design an optimized specification of IC 100. Further, the optimized specification of IC 100 is designed with respect to one or more design objectives, based on the topography-aware analysis and one or more design constraints.

Figure 7:
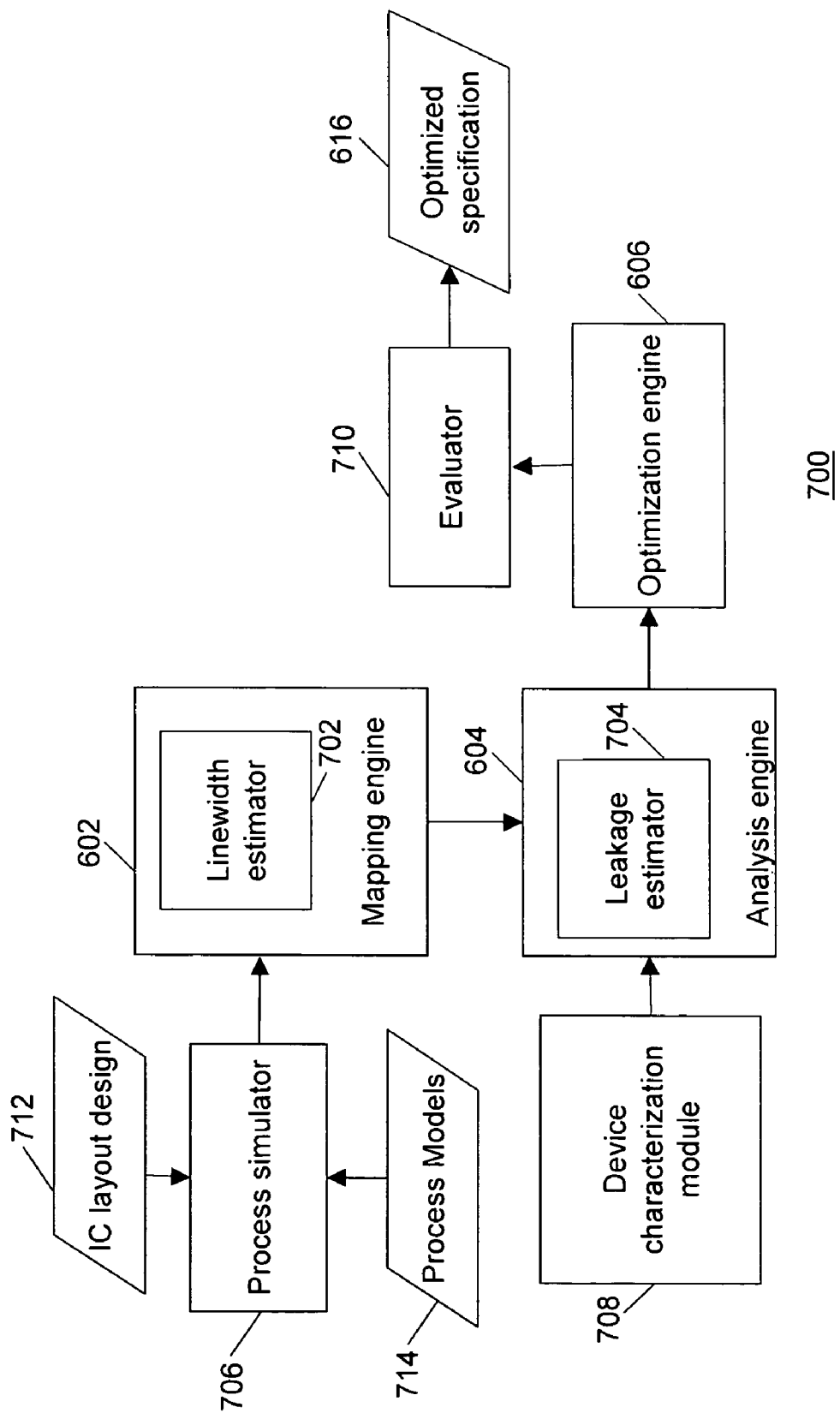
FIG. 7 is a block diagram illustrating a system for designing an optimized specification of an integrated circuit, in accordance with another embodiment of the present invention.

FIG. 7 is a block diagram illustrating a system 700 for designing an optimized specification of IC 100, in accordance with another embodiment of the present invention. System 700 can be embodied in an Electronic Design Automation (EDA) tool and can be used to design an IC. System 700 includes mapping engine 602, analysis engine 604, optimization engine 606, a linewidth estimator 702, a leakage estimator 704, a process simulator 706, a characterization module 708, and an evaluator 710. Mapping engine 602, analysis engine 604, optimization engine 606 have been explained in conjunction with FIG. 6. Process simulator 706 receives IC layout design 712 and process models 714 as inputs. Evaluator 710 outputs an optimized specification 716. Mapping engine 602 includes linewidth estimator 702. Further, process simulator 706 is coupled to mapping engine 602. Process simulator 706 is used to generate a topography map based on IC layout design 712 and the process models 714. Linewidth estimator 702 is used to determine a linewidth value for device 106 based on a pitch value and a defocus value. Further, linewidth estimator 702 includes a pitch calculator and a defocus estimator. The pitch calculator is used to determine the pitch value. The defocus estimator is used to determine the defocus value. Analysis engine 604 includes leakage estimator 704. Leakage estimator 704 is used to determine a leakage current for device 106 based on the linewidth map. Leakage estimator 704 can also determine the leakage power based on the leakage current. Characterization module 708 is used to generate one or more characterization models. Characterization module 708 includes one or more of a device characterization module, a library cell characterization module and an interconnect characterization module. The device characterization module is used to generate one or more device characterization models, based on three-dimensional shape information of the plurality of devices. The library cell characterization module is used to generate one or more library cell models, based on the one or more device characterization models. The interconnect characterization module is used to generate one or more interconnect models based on three-dimensional wiring shape information. The characterization module 708 provides the linewidth map, one or more characterization models, the design layout, and the topography map of the IC to the analysis engine 604. Evaluator 710 is used to evaluate an optimized specification of IC 100 based on one or more design metrics. Evaluator 710 receives the optimized specification of IC 100 from optimization engine 606. In one embodiment, the one or more design metrics are considered at a chip level of abstraction of IC 100. In another embodiment, the one or more design metrics are considered at a cell or block level of abstraction of IC 100. In yet another embodiment, the one or more design metrics are considered at a device level of IC 100. Further, the evaluator 710 outputs the optimized specification 716. In one embodiment, the optimized specification 716 is defined at a circuit netlist or schematic level of abstraction of the IC design. In another embodiment, the optimized specification 716 is defined at a layout level of abstraction of the IC design.

Figure 8:
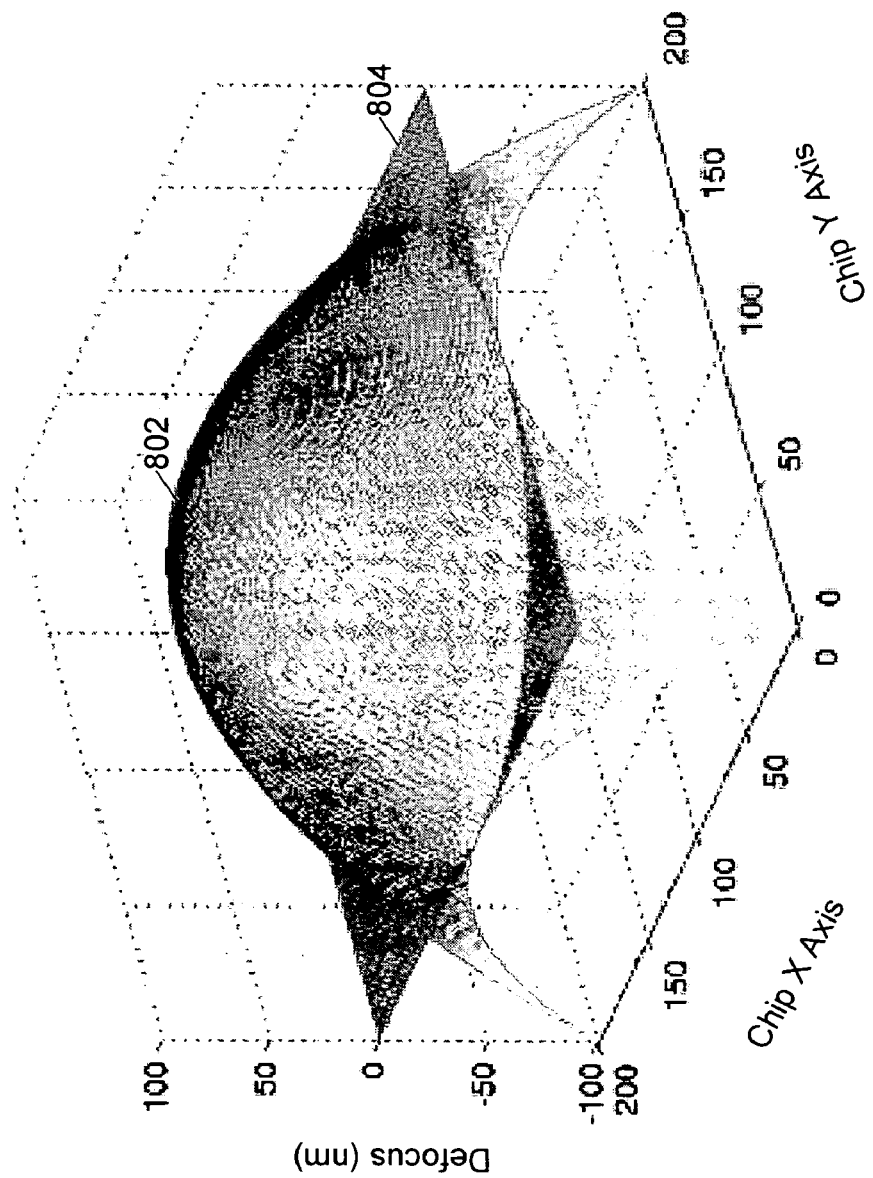
FIG. 8 is a graph illustrating exemplary experimental die topography, in accordance with an embodiment of the present invention.

FIG. 8 is a graph illustrating exemplary experimental die topography 802, in accordance with an embodiment of the present invention. The experimental die topography 802 is used to experimentally validate the defocus-aware, topography-aware (DATA) flow, as explained in conjunction with FIG. 5. In experimental die topography 802, topography height at the center is 100 nm, and quadratically reduces with an increase in distance from the center to become −100 nm at the corners. Further, a planar die topography 804 is illustrated in comparison to the experimental die topography 802. In an embodiment, the method as described in conjunction with FIG. 5 can be validated on c5315 (2,077 cells), c6288 (4,776 cells), and c7752 (3,155 cells) from the IEEE International Symposium on Circuits and Systems (ISCAS) 1985 test suite. Further, alu128 (11,724 cells) from the website http://opencores.org/ can also be used for validation. The designs can be synthesized using a logic synthesis tool such as Synopsys Design Compiler v2003.06—SPI. To create the plot 300 (Bossung lookup table), a tool such as Mentor Calibre v9.3_ 5.9 can be used for OPC and lithography simulation. For OPC and lithography simulation recipes, 100 nm linewidths with 193 nm stepper can be used, and SRAFs can be inserted to improve process window. A simulation tool such as Synopsys HSPICE vU2003.09 can be used for all SPICE simulations. Further, a tool such as Cadence SignalStorm v4.1 can be used for library characterization with, e.g., Berkeley Predictive Technology Model (BPTM) Berkeley Short-Channel IGFET Model (BSIM) version 3 device models. The designs can be placed using a tool such as Cadence System-on-Chip (SOC) Encounter v3.2.

Further, for the experiment to validate the DATA flow, in addition to the variation in linewidth of −6 nm to 2 nm due to defocus (as explained in conjunction with FIG. 3), an additional Gaussian-random variation of +8 nm to −8 nm can be assumed to yield a linewidth range from 86 nm to 110 nm. For the experiment to validate the DATO flow, the variation in linewidth due to defocus is assumed to be completely Gaussian-random.

Figure 9:
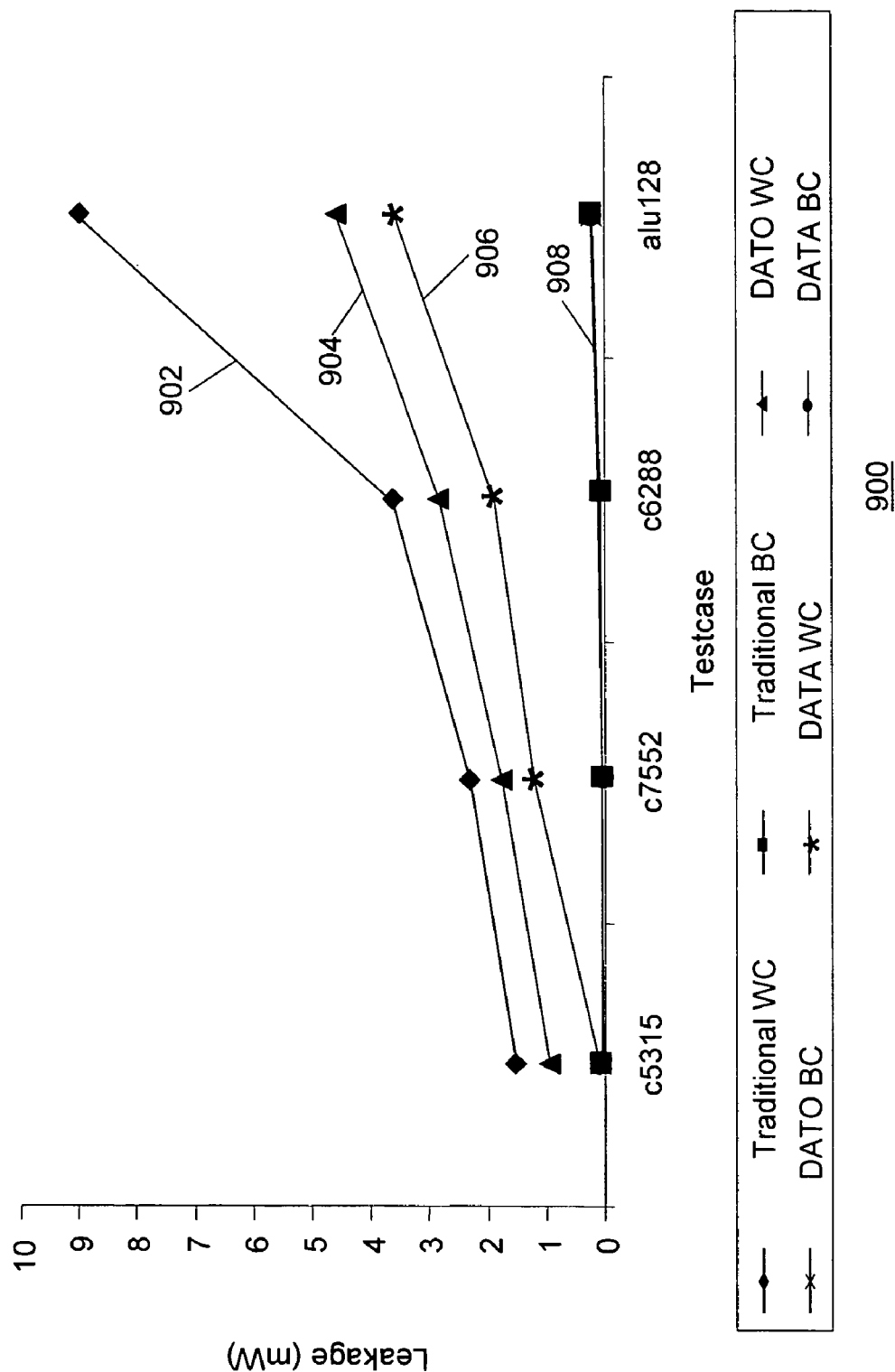
FIG. 9 is a graph illustrating leakage estimation results, in accordance with an embodiment of the present invention.

FIG. 9 is a graph 900 illustrating leakage estimation results, in accordance with an embodiment of the present invention. The graph 900 shows the worst-case (WC) and best-case (BC) estimation results for the testcases c5315, c7552, c6288, and alu128, as explained in FIG. 8, for the DATA and DATO flows. In the graph 900, the testcases are listed on the X-axis and leakage power is shown on the Y-axis. Line 902 shows results for WC leakage estimation by traditional methods. Line 904 shows WC leakage estimation results for the DATO flow that assumes defocus to be Gaussian-random with a mean of 0 nm and standard deviation of 200 nm. Line 906 shows WC leakage estimation results for the DATA flow that assumes defocus to be 50% random. The mean is assumed to be the predicted topography height and standard deviation is set to 100 nm. Line 908 is a composite of results for BC leakage estimation for traditional methods, DATO flow, and DATA flow. The BC leakage estimation for traditional methods, DATO flow, and DATA flow are not distinguishable, and hence are shown by a single composite line. Due to this, less number of lines is plotted in the graph 900, than the number of cases shown in the legend provided at the bottom of graph 900. Further, the graph 900 shows a substantial reduction in WC and BC leakage estimation results. For the c5315 testcase, the reduction in WC and BC leakage estimation is 56%. For the c7552 testcase, the reduction in WC and BC leakage estimation is 49%. For the c6288 testcase, the reduction in WC and BC leakage estimation is 49%. For the alu128 testcase, the reduction in WC and BC leakage estimation is 62%.

Table 1 shows the leakage estimation at worst-case (WC), nominal (Nom), and best-case (BC) process corners using the traditional, the DATO flow, and the DATA flow methods. The traditional methods for leakage estimation leakage assume linewidth of all devices as 86 nm for WC, 100 nm for Nom, and 110 nm for BC process corners. In the DATO flow for leakage estimation, random defocus value between −200 nm and 200 nm are assumed. The defocus value is used with pitch information to predict linewidths at WC, Nom, and BC process corners for devices in each placed standard cell instance. In the DATA flow for leakage estimation, the topography height is selected as the nominal defocus. Further, a random defocus value between −100 nm and 100 nm is added for computation of corner-case leakages. A variation of −8 nm, 0 nm, or 8 nm due to random sources is then added to the linewidth for WC, Nom, and BC leakage estimation respectively. It can be seen that for the DATO flow, there is a spread reduction between WC and BC process corners of 23% to 46% when compared to the traditional method. Similarly, it can be seen that for the DATA flow, there is a spread reduction between WC and BC process corners of 44% to 62% when compared to the traditional method.

length biasing within a cell instance results in increase of some timing arc delays and can cause some non-critical paths

TABLE 1

| Circuit | Vth | Traditional Gate Length Biasing | | | Defocus-Aware, Topography-Oblivious | | | | Defocus-Aware, Topography-Aware | | | |
|---|---|---|---|---|---|---|---|---|---|---|---|---|
| | | WC (mW) | Nom (mW) | BC (mW) | WC (mW) | Nom (mW) | BC (mW) | Spread Reduction | WC (mW) | Nom (mW) | BC (mW) | Spread Reduction |
| c5315 | Low | 8.006 | 0.956 | 0.304 | 5.269 | 0.853 | 0.377 | 35.96% | 4.119 | 0.889 | 0.337 | 50.90% |
| | Nom | 1.481 | 0.125 | 0.036 | 0.931 | 0.111 | 0.04 | 38.34% | 0.675 | 0.116 | 0.04 | 56.06% |
| c6288 | Low | 19.54 | 2.308 | 0.726 | 15.298 | 2.158 | 0.838 | 23.14% | 11.256 | 2.265 | 0.838 | 44.63% |
| | Nom | 3.625 | 0.302 | 0.086 | 2.827 | 0.282 | 0.101 | 22.97% | 1.897 | 0.297 | 0.101 | 49.25% |
| c7552 | Low | 12.327 | 1.469 | 0.465 | 9.541 | 1.36 | 0.533 | 24.06% | 7.126 | 1.433 | 0.533 | 44.42% |
| | Nom | 2.281 | 0.192 | 0.055 | 1.757 | 0.177 | 0.064 | 23.94% | 1.203 | 0.188 | 0.064 | 48.83% |
| alu128 | Low | 48.499 | 5.771 | 1.826 | 27.264 | 4.985 | 1.987 | 45.84% | 22.442 | 5.153 | 1.987 | 56.17% |
| | Nom | 8.978 | 0.754 | 0.217 | 4.574 | 0.644 | 0.238 | 50.51% | 3.577 | 0.668 | 0.238 | 61.89% |

Figure 10:
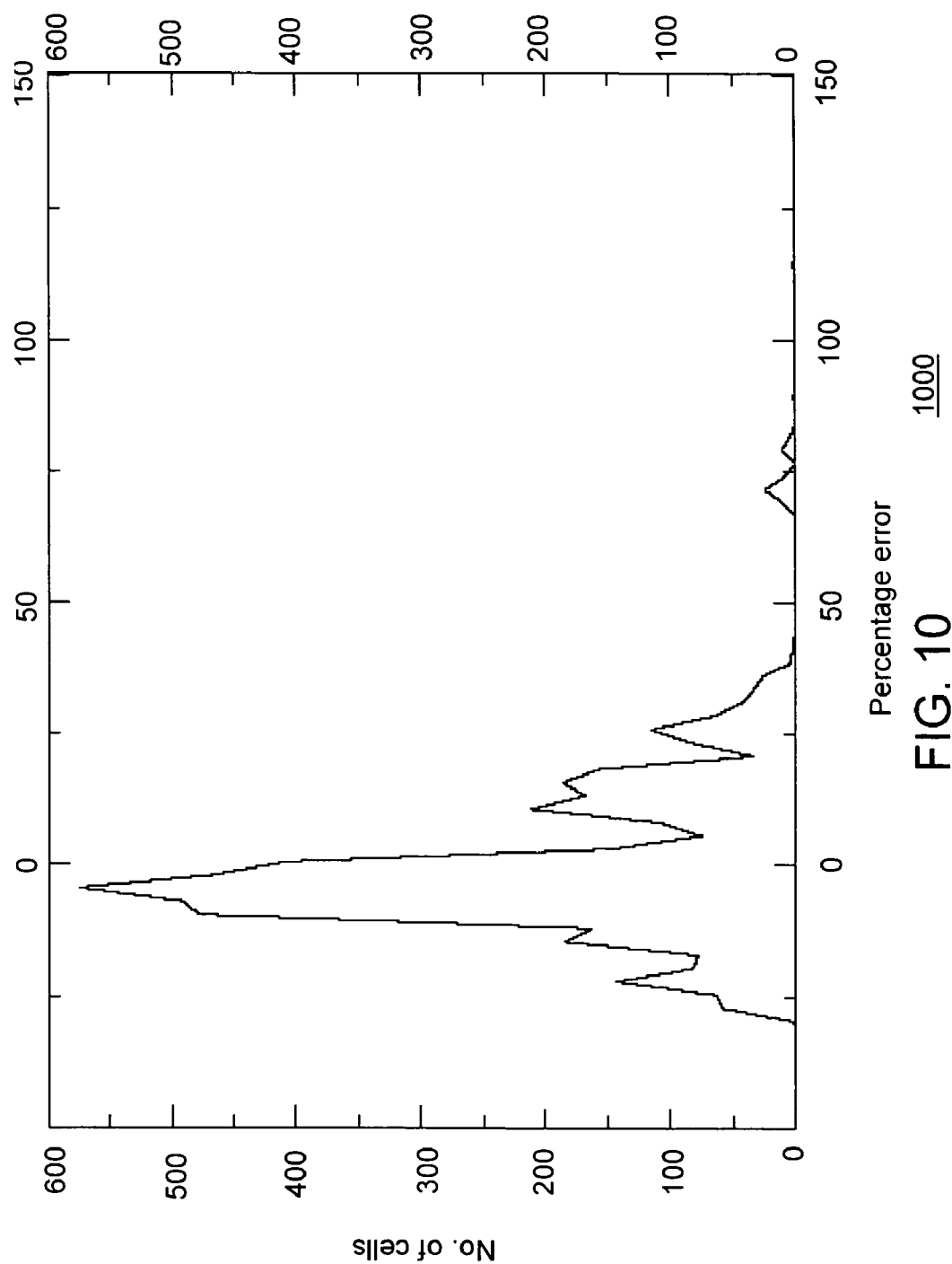
FIG. 10 is a graph illustrating error distribution of traditional leakage estimation, in accordance with an embodiment of the present invention.

FIG. 10 is a graph 1000 illustrating error distribution of traditional leakage estimation, in accordance with an embodiment of the present invention. In addition to circuit-level leakage estimation, the method described in conjunction with FIG. 5 can be used to estimate leakage of each cell with a higher accuracy. Graph 1000 shows the distribution of estimation error between cell leakage predicted by traditional estimation methods and the method described in conjunction with FIG. 5. Further, graph 1000 shows the error distribution at nominal process conditions for test case c6288 using experimental die topography 802, as explained in conjunction with FIG. 8. Graph 1000 shows that cell leakage estimation errors are in the range of −29% to 124%. Further, graph 1000 shows that while there is large error in cell leakage estimation at nominal process conditions, the error in overall circuit leakage estimation is only −1.86%. Graph 1000 also shows that per-instance error is larger than 25% even at the nominal process corner for many cells. Since leakage can be estimated per cell instance, the method as described in conjunction with FIG. 5 can be used in several leakage optimization techniques, including but not limited to $V_{th}$ assignment, input vector control, and gate length biasing, which selectively optimize cells or devices with high leakage.

In an embodiment, the method described in conjunction with FIG. 5 can be used for defocus-aware gate length biasing. Gate length biasing is based on the relationship between leakage power and delay with variation in gate length. The leakage power reduces exponentially and the delay increases linearly with increase in gate length.

Figure 11:
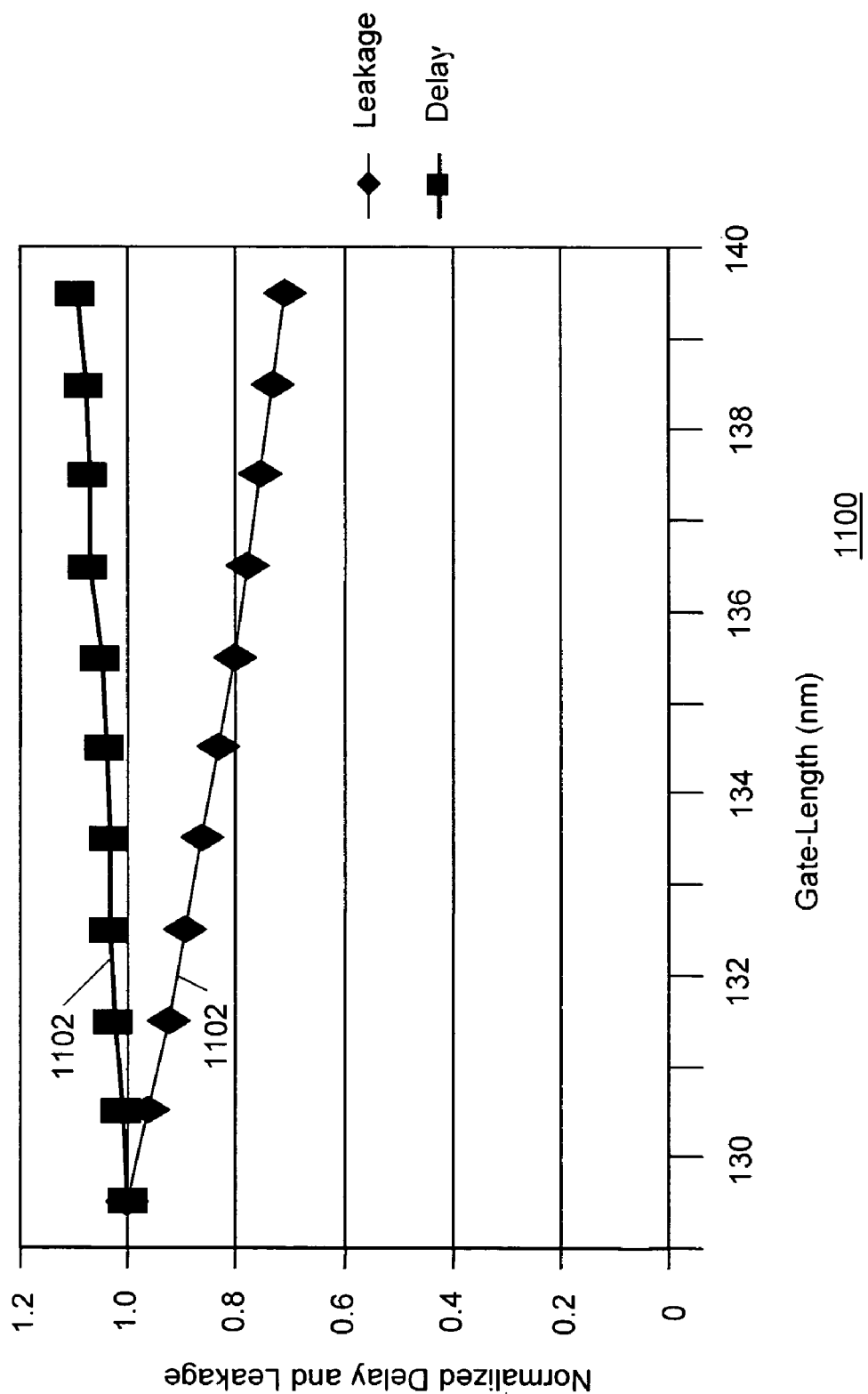
FIG. 11 is a graph illustrating variation of normalized delay and leakage with respect to gate length of devices, in accordance with an embodiment of the present invention.

FIG. 11 is a graph 1100 illustrating variation of normalized delay and leakage with respect to gate length of devices, in accordance with an embodiment of the present invention. In graph 1100, gate length is plotted on the X-axis, and variation in normalized delay and leakage is plotted on the Y-axis. Further, line 1102 shows variation of normalized delay with line width. Line 1104 shows variation of leakage with line width. Graph 1100 shows variation in normalized delay and leakage when polysilicon line width (i.e., transistor gate length) is increased from 130 nm to 140 nm for a 130 nm industry process. It can be seen that increasing the linewidth from 130 nm to 140 nm increases delay only marginally, while leakage reduces by approximately 30%. Hence, if only non-timing critical devices in a circuit are selectively biased, a reduction in circuit leakage can be achieved without increasing the circuit delay.

In traditional gate length biasing methods (with positive bias values), only devices belonging to a cell instance, and that are not on critical timing paths, are selectively biased so as to preserve minimization of the delay of the circuit. Gate length biasing within a cell instance results in increase of some timing arc delays and can cause some non-critical paths to become critical. Consequently, other cells on the newly critical paths cannot be biased. The method described in conjunction with FIG. 5 can be utilized to iteratively bias the cells using a sensitivity-based algorithm. The cells can be iteratively biased in an order of decreasing sensitivity. In an embodiment, the sensitivity can be defined as the product of leakage reduction and timing slack of a cell after biasing. That is, $$\text{Sensitivity of a cell } p = \xi_p = \Delta L_p \times s_p \quad (1)$$

where $\Delta L_p$ is the leakage reduction of cell p upon biasing and $s_p$ is the timing slack of cell p after biasing.

Further, if biasing a cell causes a timing violation, the cell may be unbiased and its gate length set back to its previous or nominal value. Such a sensitivity-based algorithm can be used in, for example, $V_{th}$ assignment and gate width sizing.

The method described in conjunction with FIG. 5 can be used to determine an expected leakage reduction. Further, a defocus-aware sensitivity is computed using the expected leakage reduction instead of the leakage reduction. Using the method described in conjunction with FIG. 5 for estimating the expected leakage reduction, the defocus-aware sensitivity can be computed using Equation (1) as follows:

$$\xi_p = \langle \Delta L_p \rangle \times s_p \quad (2)$$

where $\langle \Delta L_p \rangle$ is the expected leakage reduction of the cell p. The expected leakage reduction of the cell p $\langle \Delta L_p \rangle$ can be computed as $$\langle \Delta L_p \rangle = \Sigma_t \langle \Delta L_{pt} \rangle \quad (3)$$

where $\langle \Delta L_{pt} \rangle$ is expected leakage reduction of device t of cell p, and the summation is taken over all such devices t. Further, the expected leakage reduction of device t of cell p $\langle \Delta L_{pt} \rangle$ is a function of gate length $l_{pt}$, and can be represented as:

$$\Delta L_{pt} = f(l_{pt}) \quad (4)$$

Further, the gate length $l_{pt}$ is a function of defocus $D_{pt}$ and pitch $P_{pt}$, as explained in FIG. 5, and can be represented as $$l_{pt} = g(D_{pt}, P_{pt}) \quad (5)$$

To determine the expected leakage reduction of device t of cell p $\langle \Delta L_{pt} \rangle$ the leakage reduction of the device t can be computed at all defocus values. Further, a weighted summation can be determined where the weight is the probability of occurrence of a particular defocus value. Combining Equations (4) and (5), the expected leakage reduction of device t of cell p $\langle \Delta L_{pt} \rangle$ can be computed as $$\langle \Delta L_{pt} \rangle = \Sigma_t \Sigma_D f(g(D_{pt}, P_{pt})) \times P(D_{pt}) \quad (6)$$

where $P(D_{pt})$ is the probability that $D_{pt}$ is the defocus value. In an embodiment, the defocus D can be a Gaussian random variable. For the DATO flow, a mean of 0 nm and a standard deviation of 200 nm, for example, can be selected. For the DATA flow, a mean equal to the topography height and a standard deviation of 100 nm, for example, can be selected.

Table 2 shows a comparison between results obtained for traditional and defocus-aware (topography-aware) gate length biasing. The optimization was performed at the nominal process corner and the experimental die topography 802 from FIG. 8 was assumed. Further, defocus was assumed to be random during optimization to exploit the systematic dependence of linewidth on defocus and pitch. The results are obtained for WC, Nom, and BC process corners, as explained in FIG. 9. Delay penalty for gate length biasing can be set to 0% to prevent circuit delay from increasing after biasing. Runtime penalty due to defocus awareness can be under 10%, for all the testcases, explained in FIG. 9. Table 2 shows that leakage reductions of between 2% and 7%, incurring 10% optimization runtime increase, are achieved.

TABLE 2

| Circuit | Traditional Gate Length Biasing | | | Defocus-Aware Gate Length Biasing | | | Leakage Reduction | | |
|---|---|---|---|---|---|---|---|---|---|
| | WC (mW) | Nom (mW) | BC (mW) | WC (mW) | Nom (mW) | BC (mW) | WC (mW) | Nom (mW) | BC (mW) |
| c5315 | 3.948 | 0.855 | 0.326 | 3.838 | 0.838 | 0.321 | 2.78 | 2.01 | 1.63 |
| c6288 | 9.363 | 1.923 | 0.73 | 8.958 | 1.861 | 0.712 | 4.33 | 3.23 | 2.56 |
| c7552 | 6.678 | 1.35 | 0.507 | 6.212 | 1.28 | 0.485 | 6.98 | 5.17 | 4.21 |
| alu128 | 21.258 | 4.908 | 1.907 | 19.968 | 4.663 | 1.827 | 6.07 | 4.99 | 4.19 |

In an embodiment, defocus-aware gate length biasing can be used in conjunction with other leakage optimization methods which perform selective biasing. Further, better leakage reductions can be achieved by considering dependence of linewidth variations on gate delays during optimization.

Various embodiments of the present invention offer the following advantages. The present invention utilizes systematic components of linewidth variation to improve optimizations of signal delay, circuit timing, leakage power, active power and other design objectives, using such design optimization degrees of freedom as interconnect dimensions, transistor gate lengths, transistor threshold voltage assignments, and transistor gate widths. Further, linewidth variation is modeled using pitch and defocus. By analyzing a layout to calculate device pitches and using them with defocus and a predefined lookup table, printed linewidths can be predicted for accurate leakage estimation and designing an optimized specification. Further, the present invention reduces the spread between leakage estimation at worst case (WC) and best case (BC) process corners by almost half. Moreover, leakage estimation of individual devices can be performed with improved accuracy. The present invention can also be used within leakage optimization techniques that rely on leakage estimation of individual cells or devices. In the gate length biasing methodology, the present invention achieves larger leakage reductions than traditional methods by up to 7%. Various embodiments of the invention are compatible with existing IC design processes (LOCOS or STI, etc.). The present invention is also capable of being used within the existing IC design cycle with leakage estimation and optimized specification design being performed at the design stage in either the full-custom or the semi-custom design context.

The system for designing an integrated circuit, as described in the present invention, or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit, and the Internet. The computer comprises a microprocessor, which is connected to a communication bus. The computer also includes a memory, which may include Random Access Memory (RAM) and Read Only Memory (ROM). The computer system further comprises a storage device which can be a hard disk drive or a removable storage drive such as a floppy disk drive, optical disk drive, and so forth. The storage device can also be other similar means of loading computer programs or other instructions into the computer system.

The computer system executes a set of instructions that are stored in one or more storage elements, in order to process input data. The storage elements may also hold data or other information, as desired. The storage element may be in the form of an information source or a physical memory element present in the processing machine. Exemplary storage elements include hard disk, DRAM, SRAM and EPROM. The storage element may also be external to the computer system, and connected to or inserted into the computer, for download at or prior to the time of use. Examples of such external computer program products are computer-readable storage media such as CD-ROMs, flash chips, floppy disks, and so forth.

The set of instructions may include various commands that instruct the processing machine to perform specific tasks, such as the steps that constitute the method of the present invention. The set of instructions may be in the form of a software program. The software may be in various forms, such as system software or application software. Further, the software might be in the form of a collection of separate programs, a program module with a larger program, or a portion of a program module. The software might also include modular programming in the form of object-oriented programming. The software program containing the set of instructions can be embedded in a computer program product, for use with a computer. The computer program product comprising a computer-usable medium having a computer-readable program code embodied therein. The processing of input data by the processing machine may be in response to user commands or in response to results of previous processing, or in response to a request made by another processing machine.

While the foregoing is directed at embodiments of the present invention, other and further embodiments of the invention may be devised, without departing from the basic scope thereof, and the scope thereof is determined by the claims that follow.

What is claimed is:

1. A method for designing an optimized specification of an integrated circuit, the integrated circuit comprising a plurality of cells, each of the plurality of cells comprising a plurality of devices, the method comprising:
   preparing a linewidth map of at least one device of the plurality of devices based on one or more defocus values indicative of thickness variation of the integrated circuit, a design layout of the integrated circuit, and a topography map of the integrated circuit;
   performing a topography-aware analysis of the at least one device based on the linewidth map, one or more characterization models, and the topography map of the integrated circuit; and
   designing an optimized specification of the integrated circuit with respect to one or more design objectives, based on the topography-aware analysis and subject to one or more design constraints, wherein each method operation is executed by a processor.

2. The method according to claim 1, wherein the one or more defocus values are derived from the topography map of the integrated circuit.

3. The method according to claim 1, wherein preparing a line width map comprises preparing a defocus lookup table.

4. The method according to claim 3, wherein preparing the defocus lookup table comprises performing a lithography simulation.

5. The method according to claim 4, wherein the lithography simulation comprises simulation of at least one of a photo process, a resist process, and an etch process.

6. The method according to claim 4, wherein the lithography simulation is based on the one or more defocus values and one or more process models, and wherein each of the one or more defocus values correspond to one or more process models.

7. The method according to claim 1, wherein the topography map is based on a process simulation of the design layout of the integrated circuit with respect to one or more process models.

8. The method according to claim 7, wherein the process simulation is a Chemical-Mechanical Polishing (CMP) simulation of dielectric and metal structures in one or more consecutive interconnect layers of the integrated circuit.

9. The method according to claim 7, wherein the process simulation is a Chemical-Mechanical Polishing (CMP) simulation of shallow-trench isolation and one or more transistor-forming layers of the integrated circuit.

10. The method according to claim 7, wherein the process simulation is based on one or more reticle effects.

11. The method according to claim 7, wherein the process simulation is based on one or more wafer-scale bias effects.

12. The method according to claim 1, wherein the one or more characterization models are selected from a group consisting of one or more device models, one or more library cell models, and one or more interconnect models.

13. The method according to claim 12, wherein the one or more device models are based on three-dimensional shape information of the plurality of devices.

14. The method according to claim 12, wherein the one or more library cell models are based on the one or more device models.

15. The method according to claim 12, wherein the one or more interconnect models are based on three-dimensional wiring shape information.

16. The method according to claim 1, wherein performing the topography-aware analysis is with respect to one or more of timing information, timing slack, leakage power, reliability, parametric yield, random defect yield, and total power of the integrated circuit.

17. The method according to claim 1, wherein designing the optimized specification of the integrated circuit is further based on one or more predefined parameters of optimization, wherein the one or more predefined parameters of optimization are selected from a group consisting of transistor gate length sizing, transistor gate width sizing, transistor threshold voltage assignment, and interconnect dimensional sizing.

18. The method according to claim 1, wherein the one or more design constraints are selected from a group consisting of clock period constraints, boundary timing constraints, setup time slack constraints, hold time slack constraints, arrival time skew constraints, leakage power constraints, dynamic power constraints, reliability constraints.

19. The method according to claim 1, further comprising evaluating the optimized specification of the integrated circuit based on one or more design metrics.

20. The method according to claim 19, wherein the one or more design metrics are selected from a group consisting of lithographic process window, total leakage power, maximum clock frequency, functional yield, and parametric yield at a given target clock frequency.

21. The method according to claim 19, wherein the one or more design metrics are considered at a chip level of abstraction of the integrated circuit design.

22. The method according to claim 19, wherein the one or more design metrics are considered at cell level of abstraction of the integrated circuit design.

23. The method according to claim 19, wherein the one or more design metrics are considered at a block level of abstraction of the integrated circuit design.

24. The method according to claim 19, wherein the one or more design metrics are considered at a device level of abstraction of the integrated circuit design.

25. The method according to claim 1, wherein the optimized specification is defined at a circuit level of abstraction of the integrated circuit design.

26. The method according to claim 1, wherein the optimized specification is defined at a layout level of abstraction of the integrated circuit design.

27. The method according to claim 1, wherein the method is embodied in an Electronic Design Automation (EDA) tool that includes one or more computer executable programs for executing the method.

28. The method according to claim 1, wherein the method is embodied in one or more computer programs which are executable on a computer system.

29. The method according to claim 1, wherein the method is utilized to design an integrated circuit.

30. A system for designing an optimized specification of an integrated circuit, the integrated circuit comprising a plurality of cells, each of the plurality of cells comprising a plurality of devices, the system comprising:
   a mapping engine for preparing a linewidth map of at least one device of the plurality of devices based on one or more defocus values indicative of thickness variation of the integrated circuit, a topography map, and a design layout of the integrated circuit;
   an analysis engine for performing a topography-aware analysis of the at least one device based on the linewidth map, one or more characterization models, the design layout of the integrated circuit, and the topography map of the integrated circuit, and the topography map of the integrated circuit; and an optimization engine for designing an optimization specification of the integrated circuit with respect to one or more design objectives, based on the topography-aware analysis and one or more design constraints.

31. The system according to claim 30, wherein the mapping engine further comprises a linewidth estimator for determining a linewidth value for the at least one device based on pitch value and a defocus value.

32. The system according to claim 31, wherein the linewidth estimator further comprises:
a pitch calculator for determining the pitch value; and
a defocus estimator for determining the defocus value.

33. The system according to claim 30, wherein the analysis engine further comprises a leakage estimator for determining a leakage power for the at least one device based on the linewidth map.

34. The system according to claim 30 further comprising a process simulator for generating the topography map, wherein the topography map is based on the layout design of the integrated circuit and one or more process models.

35. The system according to claim 30 further comprising a characterization module for generating one or more characterization models.

36. The system according to claim 35, wherein the characterization module further comprises:
a device characterization module for generating one or more device models based on three-dimensional shape information of the plurality of devices;
a library cell characterization module for generating one or more library cell models based on the one or more device models; and
an interconnect characterization module for generating one or more interconnect models based on three-dimensional wiring shape information.

37. The system according to claim 30 further comprising an evaluator for evaluating the optimized specification of the integrated circuit based on one or more design metrics.

38. The system according to claim 37, wherein the one or more design metrics are considered at a chip level of abstraction of the integrated circuit design.

39. The system according to claim 37, wherein the one or more design metrics are considered at a cell level of abstraction of the integrated circuit design.

40. The system according to claim 37, wherein the one or more design metrics are considered at a block level of abstraction of the integrated circuit design.

41. The system according to claim 37, wherein the one or more design metrics are considered at a device level of abstraction of the integrated circuit design.

42. The system according to claim 30, wherein the optimized specification is defined at a circuit level of abstraction of the integrated circuit design.

43. The system according to claim 30, wherein the optimized specification is defined at a layout level of abstraction of the integrated circuit design.

44. The system according to claim 30, wherein the system is embodied in an Electronic Design Automation tool.

45. The system according to claim 30, wherein the system is utilized to design an integrated circuit.

* * * * *